US010805318B2

(12) United States Patent
Manadhata

(10) Patent No.: US 10,805,318 B2
(45) Date of Patent: Oct. 13, 2020

(54) IDENTIFICATION OF A DNS PACKET AS MALICIOUS BASED ON A VALUE

(71) Applicant: Hewlett Packard Enterprise Development LP, Houston, TX (US)

(72) Inventor: Pratyusa K Manadhata, Piscataway, NJ (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/755,880

(22) PCT Filed: Aug. 28, 2015

(86) PCT No.: PCT/US2015/047524
§ 371 (c)(1),
(2) Date: Feb. 27, 2018

(87) PCT Pub. No.: WO2017/039593
PCT Pub. Date: Mar. 9, 2017

(65) Prior Publication Data
US 2018/0332056 A1 Nov. 15, 2018

(51) Int. Cl.
*G06F 12/14* (2006.01)
*H04L 29/06* (2006.01)
(Continued)

(52) U.S. Cl.
CPC .......... *H04L 63/1416* (2013.01); *H04L 43/16* (2013.01); *H04L 61/1511* (2013.01); *H04L 43/0829* (2013.01)

(58) Field of Classification Search
CPC ... G06F 21/561; H04L 69/22; H04L 63/1441; H04L 63/0245; H04L 61/1511; H04L 29/06877
(Continued)

(56) References Cited

U.S. PATENT DOCUMENTS 7,757,283 B2 7/2010 Robert et al.
7,926,108 B2 4/2011 Rand et al.
(Continued)

FOREIGN PATENT DOCUMENTS

CN 101005390 A 7/2007
CN 103944788 A 7/2014
(Continued)

OTHER PUBLICATIONS

Takemori et al, Detection of Bot Infected PCs Using Destination-Based Ip and Domain Whitelists During a Non-Operating Term, 2008, IEEE, pp. 1-6.*
(Continued)

*Primary Examiner* — Alexander Lagor
*Assistant Examiner* — Jenise E Jackson
(74) *Attorney, Agent, or Firm* — Hewlett Packard Enterprise Patent Department

(57) ABSTRACT

Examples classify a payload field within a domain name system (DNS) packet according to a level of risk associated with the payload field. Based on the classification of the payload field and based on a weight associated with the level of risk, the examples determine a value of the DNS packet. Based on the value, the examples identify whether the DNS packet is malicious.

20 Claims, 14 Drawing Sheets

(51) Int. Cl.
*H04L 12/26* (2006.01)
*H04L 29/12* (2006.01)

(58) Field of Classification Search
USPC .......................................................... 726/23
See application file for complete search history.

(56) References Cited

U.S. PATENT DOCUMENTS

| | | | |
|---|---|---|---|
| 8,451,806 | B2 | 5/2013 | Kumar et al. |
| 8,874,723 | B2 | 10/2014 | Terasaki et al. |
| 8,898,773 | B2 | 11/2014 | Kummu et al. |
| 9,021,079 | B2 | 4/2015 | Pulleyn et al. |
| 2003/0005157 | A1 | 1/2003 | Chung et al. |
| 2008/0253380 | A1* | 10/2008 | Cazares ............. H04L 12/4666 370/395.53 |
| 2011/0302656 | A1* | 12/2011 | El-Moussa .......... H04L 63/1425 726/24 |
| 2012/0047571 | A1* | 2/2012 | Duncan ............... H04L 61/1511 726/13 |
| 2014/0096251 | A1 | 4/2014 | Doctor et al. |
| 2015/0106909 | A1* | 4/2015 | Chen ................... H04L 63/0272 726/12 |
| 2015/0195291 | A1* | 7/2015 | Zuk ....................... H04L 63/145 726/23 |
| 2015/0195299 | A1 | 7/2015 | Zoldi et al. |
| 2016/0014147 | A1 | 1/2016 | Zoldi et al. |
| 2016/0026796 | A1 | 1/2016 | Monrose et al. |
| 2016/0269442 | A1 | 9/2016 | Shieh |
| 2017/0272454 | A1 | 9/2017 | Seo et al. |
| 2017/0366507 | A1 | 12/2017 | Hastings |
| 2018/0034738 | A1 | 2/2018 | Zsohar et al. |
| 2018/0109494 | A1 | 4/2018 | Yu et al. |

FOREIGN PATENT DOCUMENTS

| | | |
|---|---|---|
| CN | 104246788 A | 12/2014 |
| KR | 10-2008-0063952 A | 7/2008 |
| KR | 10-2012-0072992 A | 7/2012 |
| KR | 10-2012-0087393 A | 8/2012 |
| KR | 10-1187023 B1 | 9/2012 |
| KR | 10-1538374 B1 | 7/2015 |
| WO | 2014/138205 A2 | 9/2014 |

OTHER PUBLICATIONS

Davuth et al, Clasification of Malicious Domain Names Using Support Vector Machine and Bi-gram Method, International Journal of Security and its Applications, vol. 7, No. 1, Jan. 2013, pp. 51-58.*
International Search Report and Written Opinion received for PCT Patent Application No. PCT/US2015/047524, dated Jun. 13, 2016, 10 pages.
International Search Report and Written Opinion received for PCT Patent Application No. PCT/US2015/047497, dated Jun. 13, 2016, 9 pges.
International Preliminary Report on Patentability received for PCT Patent Application No. PCT/US2015/047524, dated Mar. 15, 2018, 9 pages.
International Preliminary Report on Patentability received for PCT Patent Application No. PCT/US2015/047497, dated Mar. 15, 2018, 8 pages.
Extended European Search Report, EP Application No. 15903182.2, dated Mar. 21, 2018, pp. 1-8, EPO.
Efficient iP, Secure and Hardened DNS Appliances for the Internet, Datasheet, 2013, 7 pages.
Arrow ECS, Channel Advisor, published by CPI Media Group, Issue 2, Oct. 2014, 28 pages.
Takemori et al., "Detection of Bot Infected PCs Using Destination-based IP and Domain Whitelists during a Non-operating Term", IEEE, 2008, pp. 1-6.
Yadav et al., "Detecting Algorithmically Generated Domain-Flux Attacks With DNS Traffic Analysis", IEEE/ACM Transactions on Networking, vol. 20, No. 5, Oct. 2012, pp. 1663-1677.

* cited by examiner

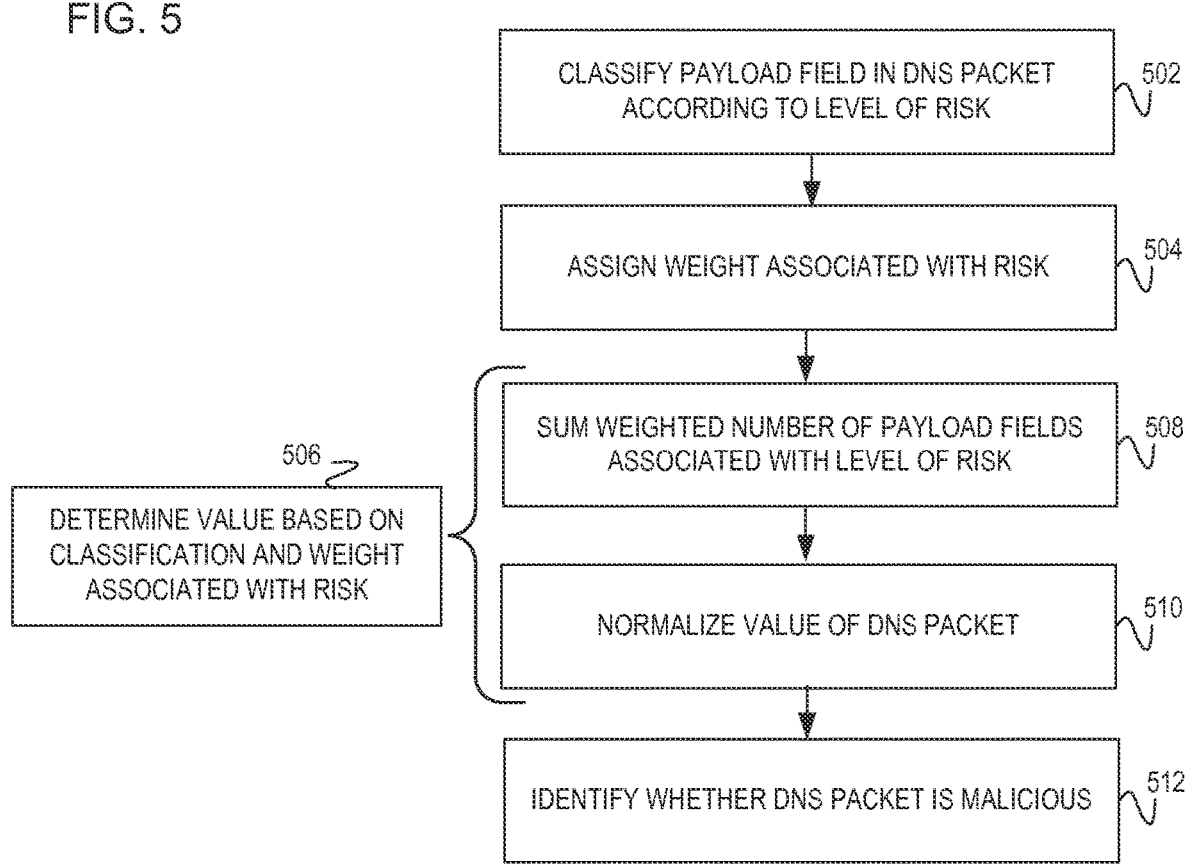

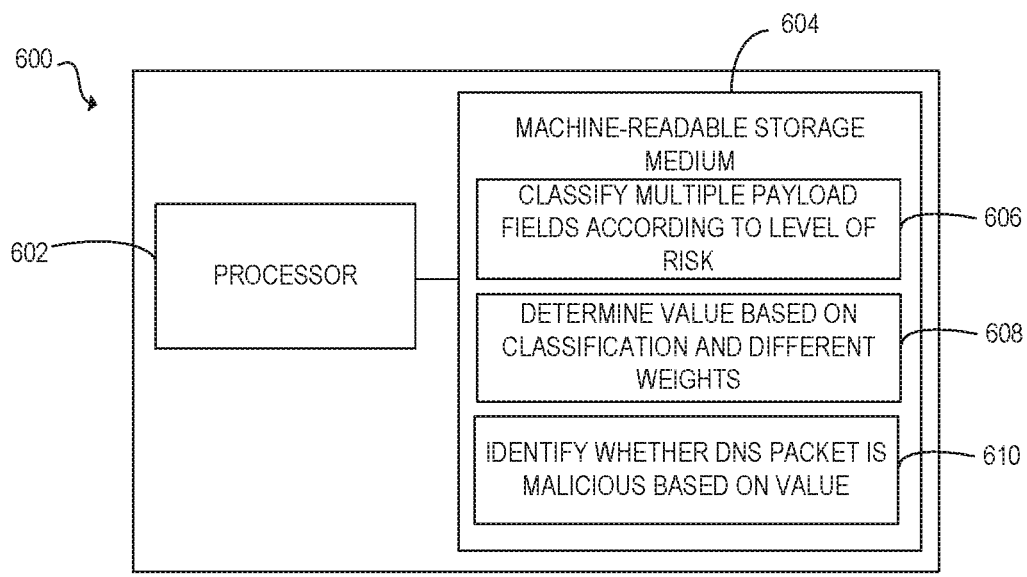

IDENTIFICATION OF A DNS PACKET AS MALICIOUS BASED ON A VALUE

BACKGROUND

A Domain Name System (DNS) enables applications to find resources on the Internet based on user-friendly names (e.g., domain names) rather than a dot-decimal notation. In the DNS system, a client may use a domain name to request an Internet Protocol (IP) address.

BRIEF DESCRIPTION OF THE DRAWINGS

In the accompanying drawings, like numerals refer to like components or blocks. The following detailed description references the drawings, wherein.

DETAILED DESCRIPTION

In the DNS system, a client may use a domain name to request the IP address; however, the domain names may be malicious. Malicious domain names are considered unsafe as the domain may be operated with malicious intent or purpose. Such malicious domain names may be identified by processing a header within a DNS packet. For example, a source of the DNS packet is identified and based on whether the source is considered malicious, the DNS packet may in turn be classified as malicious. This is inefficient as the source of the DNS packet may not be infected, but the source may be directing packets to the malicious domain name. Further this example may be unreliable as the source may appear to be non-infected, thus the DNS packet may be incorrectly labeled as benign.

To address these issues, examples disclosed herein provide a mechanism to identify if a DNS packet is malicious based on a determined value. The examples classify payload fields in the DNS packet in accordance to various levels of risk. The classification of the payload field in accordance to the levels of risk may be implemented, for example, as disclosed in Patent Cooperation Treating (PCT) International Application Number PCT/US2015/047497 filed Aug. 28, 2015. Based on the classification of the payload fields and different weights associated with the various levels of risk, the value is determined. The determined value is associated with a scoring function which takes as input a set of different labeled payload fields and outputs the value. The value may indicate whether the DNS packet is malicious or benign. Using the scoring function enables different classifications of inputs to be used to determine the overall value of the DNS packet. Using the overall value of the DNS packet provides a more accurate depiction of whether the DNS packet is truly malicious.

In another example, the value may be obtained through various statistical functions. In this example, a statistical model may be used to identify which given statistical function to implement to determine the value. The statistical model may include a set of assumptions of the classifications of the payload fields and/or weights associated with the levels of risk. This allows the implementations of different decision policies (e.g., implemented by corresponding, associated statistical functions) to determine the value.

In a further example, a packet drop rate or packet log rate may be incorporated into the decision process. The DNS packet may be identified as malicious if the value is above a specified threshold or as benign if the value is below the specified threshold. The specified threshold serves as the packet rate in which an administrator may choose to capture more malicious traffic or discard more benign traffic. For example, the specified threshold may be adjusted to capture more or less malicious traffic. This allows the network administrator s to customize the decision process.

Figure 1:
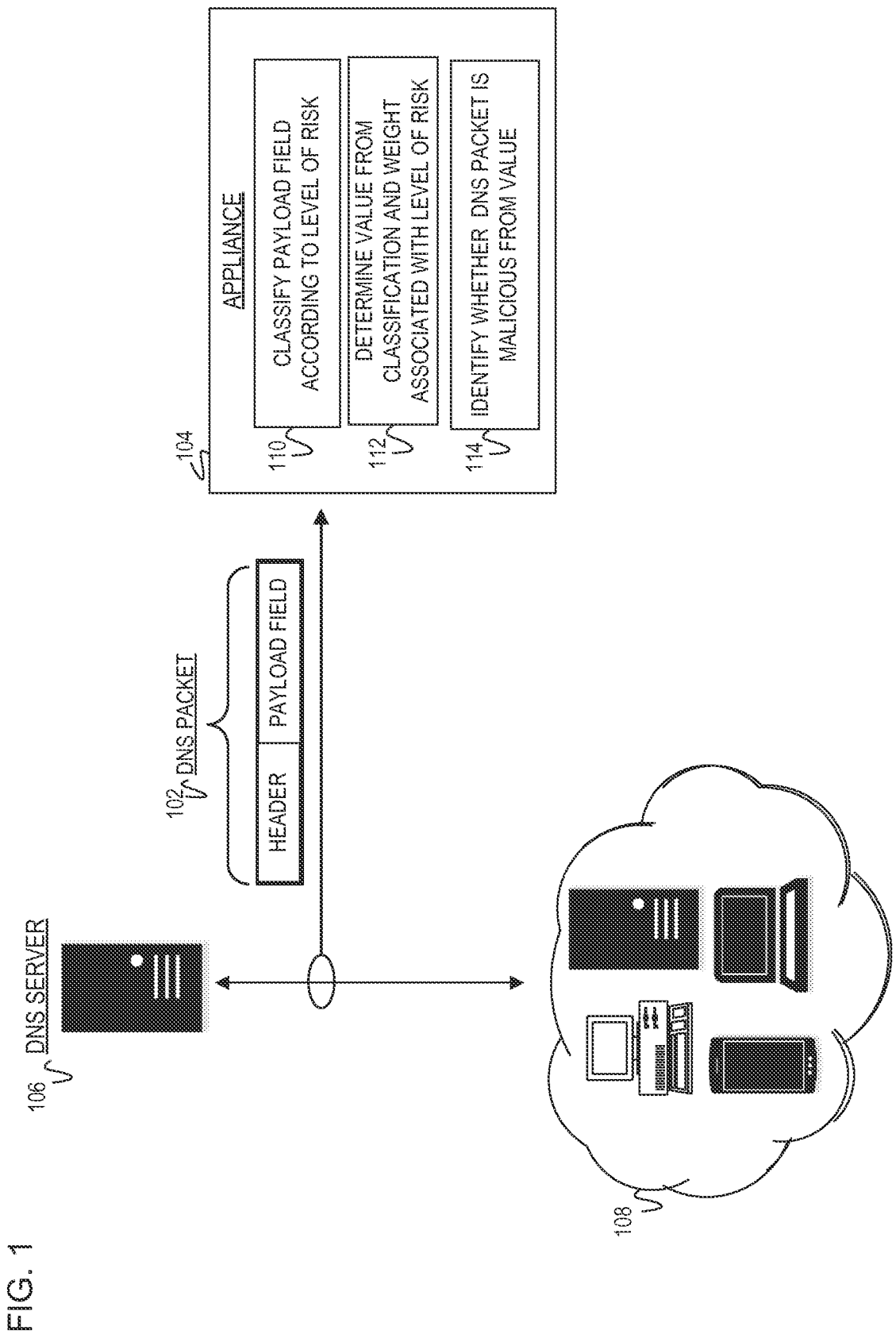
FIG. 1 is a block diagram of an example system including an appliance to capture a DNS packet from traffic between a client and a DNS server.

Referring now to the figures, FIG. 1 is a block diagram of a system including an appliance 108 to capture a DNS packet 102 from traffic between a DNS server 104 and a client 106. The appliance 108 classifies a payload field in accordance with a level of risk at module 110. Using the level of risk classification, the appliance 108 determines a value at module 112. The value is based on the level of risk classification and a weight associated with the level of risk. In this manner, the value serves as a scoring function in which to score the DNS packet 102 to identify whether the DNS packet 102 is malicious at module 114. The system in FIG. 1 represents a networking system to receive and transmit DNS traffic. As such, implementations of the system include a domain name system (DNS) networking, wide area network, legacy network, local area network (LAN), Ethernet, optic cable network, software defined network (SDN), or other type of networking system capable of handling DNS traffic. Although FIG. 1 illustrates the system as including components 104, 106, and 108 implementations should not be limited as the system may include additional components such as an auxiliary appliance and/or additional DNS server. This implementation may be discussed in detail in the next figure.

The DNS packet 102 is considered a networking data packet which is a formatted unit of data carried as DNS traffic between the client(s) 106 and the DNS server 104. The DNS packet 102 comprises at least two kinds of data including a header and the payload field. The header describes various information such as the type of packet (e.g., DNS), which payload fields are contained in the DNS packet 102, etc. The header may include the IP header and the DNS header as part of the DNS packet 102. Following the header are a number of payload fields. The payload fields are those fields in the DNS packet 102 which are classified in accordance to a level of risk. The level of risk for each of the payload fields may be obtained by a data extraction of information from the field, such as a domain name. Using the domain name from the payload field, the appliance 108 may determine the level of risk for the particular payload field. For example, if the domain name is considered a malicious domain name, that particular payload field is classified as a high level of risk. This allows different payloads fields to classified differently. Implementations of the payload fields may include, by way of example, a query field, a response field, an authority field, and an additional field.

The DNS server 104 is a name server which implements a network service for providing an IP address response to a domain name query. In this manner, the DNS server 104 provides a directory service. For example, the DNS server 104 may receive a service protocol request from the client 106 to translate the domain name into the IP address which is transmitted back to the requester. In response the DNS server 104 returns the IP address back to the client 106. As such, implementations of the DNS server 104 include a Local Area Network (LAN) server, web server, cloud server, network server, file server, or other type of computing device capable of receiving domain name requests and returning an IP address(es) in responses.

The client 106 is a networking component that accesses the directory services as provided by the DNS server 104. In this manner, the client 106 exchanges DNS traffic with the DNS server. The client 106 transmits DNS requests with the domain name to the DNS server 104 and receives DNS responses with the requested IP address. Implementations of the client 106 include a router, server, mobile device, computing device, networking switch, virtual networking component or other type of networking component cable of exchanging DNS traffic with the DNS server 104. Although the client 106 includes multiple computing devices to exchange DNS traffic with the DNS server 104, implementations should not be limited as the client may include a single computing device and/or a virtual device.

The appliance 108 captures the DNS packet 102 from the DNS traffic between the DNS server 104 and the client(s) 106. In one implementation, the appliance 108 captures a copy of packet which is transmitted as the traffic. In this implementation, the appliance 108 operates in the background of the DNS traffic between the DNS server 104 and the client(s) 106. The appliance 108 is considered a networking device which is dedicated to the identification of whether the DNS packet 102 is malicious. As such implementations of the appliance 108 include, by way of example, a router, server, a networking switch, a computing device, a virtual networking component, or other type of networking component capable of determining the value and identifying whether the DNS packet 102 is malicious from the value.

At modules 110-114, the appliance 108 identifies whether the DNS packet 102 is malicious based on a determined value. The appliance 108 classifies the payload field according to the level of risk. The level of risk is a classification which indicates whether each particular payload field is possibly directed to a malicious domain name or benign domain name. In implementations, the appliance 108 extracts a domain name and based on the classification of the domain name, each particular payload field is classified accordingly. Classifying the various payload fields within the DNS packet 102 provides a more accurate identification of whether the overall DNS packet 102 is malicious or benign. Using the classification of the payload field and using the weight associated with the level of risk, the appliance 108 proceeds to determine the value at module 112. In implementations, the value is determined by a statistical function. Inputs to the statistical function include the classification of the payload field (e.g., high level of risk, low level of risk, etc.) and the weight associated with the level of risk. The weight associated with the level of risk allows the number of payload fields associated with each specific level of risk to contribute more to the overall value of the DNS packet 102 than others. For example, a higher level of risk classification may include a heavier value weight than a lower level of risk classification. In this example, different weights are provided for the different levels of risk classification. Using the determined value, the appliance 108 may proceed to identify whether the DNS packet 102 is malicious at module 114. In other implementations, if the determined value is above a specified threshold, the DNS packet 102 may be considered malicious. In turn, if the determined value is below the specified threshold, the DNS packet 102 may be considered not malicious (i.e., benign). The modules 110-114 may include, by way of example, instructions (e.g., stored on a machine-readable medium) that, when executed (e.g., by the appliance 108), implement the functionality of modules 110-114. Alternatively, or in addition, the modules 110-114 may include electronic circuitry (i.e., hardware) that implements the functionality of modules 110-114.

Figure 2:
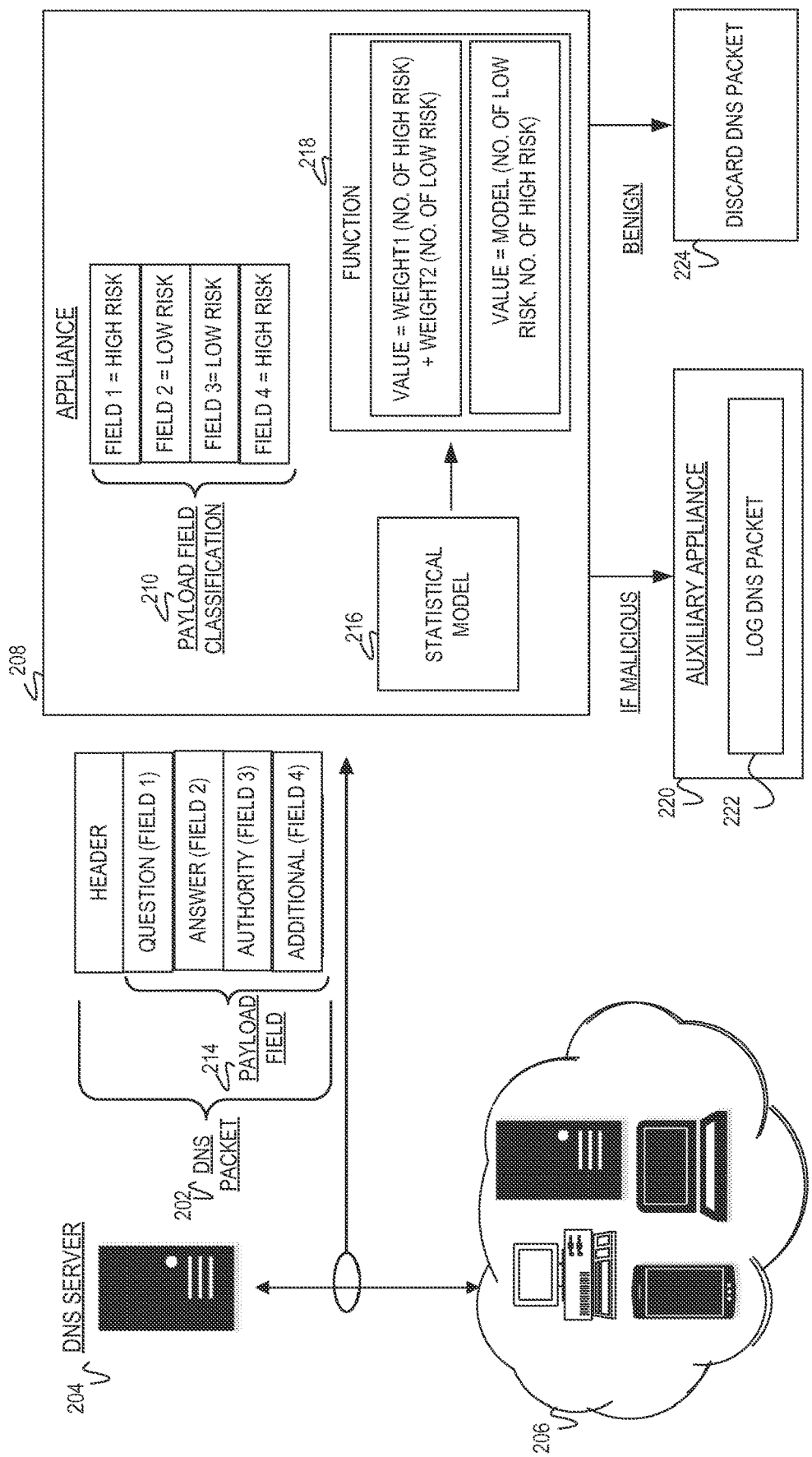
FIG. 2 is a block diagram of an example system including an appliance to identify whether a DNS packet is malicious based on a value determined by classification of a level of risk associated with a payload field and a weight associated with the level of risk.

FIG. 2 is a block diagram of an example system including an appliance 208 to identify whether a DNS packet 202 is malicious based on a value. The value may be determined by classifications of payload fields 210 and different weights associated with different levels of risk. The appliance 208 captures the DNS packet 202 from traffic between a client 206 and a DNS server 204. The DNS packet 202 includes a header and the payload fields 214. Using the captured DNS packet 202, the appliance 208 classifies each of the payload fields 214 into different levels of risk 210. The classified levels of risk 210 include a high level of risk indicating that the particular payload field is malicious and a low level of risk indicating that the given payload field is benign. Using the classified levels of risk 210 and using weights associated with each levels of risk, the appliance 208 proceeds to identify the value. In one implementation, the appliance 208 may use various statistical functions 218 to determine the value. In a further implementation, the appliance 208 may use a statistical model 216 to obtain the specific statistical function 218 to obtain the value. Based on the value, the appliance 208 may identify whether the DNS packet 202 is malicious. In this implementation, if the value is above a specified threshold, the DNS packet 202 is considered malicious. Based on the determination the DNS packet 202 is malicious, an auxiliary appliance 220 may proceed to log the DNS packet 202 at module 222. If the value is below the specified threshold, then the DNS packet is considered benign. Based on the determination of the DNS packet 202 as benign, the appliance 208 may proceed to discard the packet at module 224.

The DNS packet 202 includes a header and payload fields 214. The payload fields 214 are those fields in the DNS packet 202 which contains the data for classification by the appliance 208. The payload fields 214 include, by way of example, a question field, an answer field, an authority field, and/or an additional field.

The appliance 208 classifies each of the payload fields 214 to obtain the level of risk classification 210. In an implementation, a domain name or other related data is extracted from each of the payload fields 214 to classify whether the payload field is a high level risk or low level of risk. For example, the appliance 208 may utilize a list of malicious domain names. The list of malicious domain names, also referred to as a blacklist, includes a list of domain names which are directed to malicious websites. As such, the appliance 208 compares the extracted domain name to the list of malicious domain names to classify each of the payload fields 214. If the extracted domain name appears on the list of malicious domain names, the corresponding payload field is classified as the high level of risk. In this example, the appliance 208 may further utilize a list of benign domain names. The list of benign domain names, also referred to as a whitelist, includes those domain names which are known to be directed to safe websites. If the extracted domain name appears on the list of benign domain names, the corresponding payload field is classified as the low level risk.

In keeping with the previous example, Fields 1-4 in the classification 210 are labeled as the high level of risk or low level of the risk. Each of the payload fields 214 within the DNS packet 202 corresponds to the field number. Fields 1 and 4 which correspond to the question field and the additional field within the DNS packet 202 are labeled as the high level of risk. The high level of risk label indicates that the data within the question field and the additional field include blacklisted data. Fields 2-3 which correspond to the answer field and the authority field within the DNS packet 202 are labeled as the low level of risk. The low level of risk indicates that the data within the answer field and the authority field include whitelisted data. These labels may be used as input into one of the various statistical functions 218 to determine the value.

The appliance 208 may proceed to determine the value using one of the various statistical functions 218. The various statistical functions 218 utilize the levels of risk classifications 210 and the weight associated with each level of risk to calculate the value. In one implementation, the appliance 208 may sum together the weighted payload fields corresponding to the particular levels of risk. In this implementation, the value is equal to (weight 1*no. of high risk fields)+(weight2*no. of low risk fields). The weights represent different values associated with the different levels of risk. For example, assume the weight 1 is a greater value than weight 2, this means the calculation of the high risk fields would affect the value more than the calculation of the low risk fields. In another implementation, the statistical model 216 is used to derive the function. In this implementation, the statistical model 216 may be used to obtain the statistical function to determine the value. Although the various statistical functions 218 include two functions, implementations should not be limited as this was done for illustration purposes. For example, the various statistical functions 218 may further include a normalization function, a decision tree, a probability function, etc.

The auxiliary appliance 220 receives the DNS packet 202 based on the appliance 208 determining the DNS packet 202 is malicious. The auxiliary appliance 220 may proceed to log the DNS packet at module 222. In implementations, the auxiliary appliance 220 is located remotely to the DNS server 204 and the appliance 208. In this manner, the auxiliary appliance 220 is considered an independent appliance from the appliance 208. The auxiliary appliance 220 may be similar in structure to the appliance 108 and 208 as in FIGS. 1-2.

At module 222, the auxiliary appliance 220 logs the DNS packet based on the determination that the DNS packet 202 is malicious. During the logging process, the DNS packet 202 is stored locally on the auxiliary appliance 220 for analysis. Such analysis may include determining whether the requesting party is infected and/or targeted device is infected. For example, module 222 may include performing a domain generation algorithm check, tracking a number of malicious DNS packets generated over a period of time from a particular requesting party and/or targeted requesting party. The analysis may indicate to the auxiliary appliance 220 whether the source of the DNS packet 202 and/or the machine hosting the domain name may be infected.

At module 224, based on the value being below the specified threshold, the appliance 208 determines the DNS packet 202 is benign. Based on the determination of the DNS packet 202 as benign, the appliance 208 proceeds to discard the DNS packet 202. Discarding the DNS packet means to drop that DNS packet which is from or directed to a non-infected machine or a safe website. This reduces the traffic which may be logged for the analysis. Although FIG. 2 illustrates module 224 as remotely located to the appliance 208, this was done for illustrations purposes as the module 224 may be located as part of the appliance 208.

Figure 3:
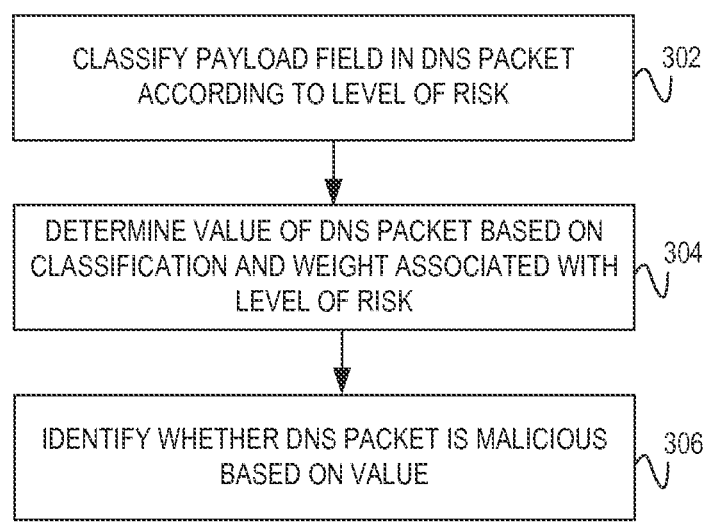
FIG. 3 is a flowchart of an example method executable by a networking device to identify whether a DNS packet is malicious from a value.

FIG. 3 illustrates a flowchart of an example method to identify whether a DNS packet is malicious based on a value. The method is executable by a computing device to classify a payload field in the DNS packet in accordance with a level of risk. The computing device determines the value based on the classification of level of risk associated with the payload field and also based on a weight associated with the classified level of risk. Upon determining the value, the computing device identifies whether the DNS packet is malicious. In discussing FIG. 3, references may be made to the components in FIGS. 1-2 to provide contextual examples. In one implementation, the appliance 104 executes operations 302-306 to determine if the DNS packet is malicious based on the determined value. Although FIG. 3 is described as implemented by the appliance 104, it may be executable on other suitable components. For example, FIG. 3 may be implemented in the form of executable instructions on a machine-readable storage medium 604 and 704 as in FIGS. 6-7.

At operation 302, the computing device classifies the payload field in the DNS packet. The payload field is classified according to a level of risk associated with the payload field. As such, each payload field may be ranked as a high level of risk or low level of risk. The levels of risk indicate whether the particular payload field is considered malicious or benign. The classification may occur from extracting data such as a domain name from each payload field in the DNS packet. Using the extracted domain name, the computing device processes against a list of known malicious domain names and then against a list of known benign names. If the extracted domain name or an ancestor domain name appears on the list of malicious domain names, that payload field is classified as the high level risk. In this implementation, if neither the extracted domain name nor or an ancestor domain name appears on the list of malicious domain names, the computing device proceeds to check a list of benign domain names. If the extracted domain name or an ancestor domain name appears on the list of benign domain names, then the payload field is classified as the low level of risk.

At operation 304, the computing device determines the value based on the level of risk classification from the payload field and based on the weight associated with the level of risk. In implementations, the computing device performs a statistical function to determine the value. For example, the statistical approach may include summing the weighted number of payload fields corresponding to a specific risk level, averaging the value, normalizing the value, etc. In another implementation, the statistical function may be obtained through the use of machine learning. In this implementation, a set of features related to the payload fields are identified. Using the set of features, the statistical function may be obtained. This statistical function is the mathematical function in which to determine the value. With the use of machine learning, the values of the weights associated with the levels of risks and the number of type of classifications may be determined. For example, deployments of existing classifications and value determinations may be used to construct the training sets of data including the values of the weights and classification data. In a further implementation, a set of features weighting values and classification values) may be used to learn and/or derive the statistical function to determine the value.

At operation 306, upon determining the value at operation 304, the computing device identifies whether the DNS packet is malicious. In one implementation if the value is above a specified threshold, then this indicates that the DNS packet is malicious. In this implementation if the value is below the specified threshold, then this indicates that the DNS packet is benign (i.e., not malicious).

Figure 4:
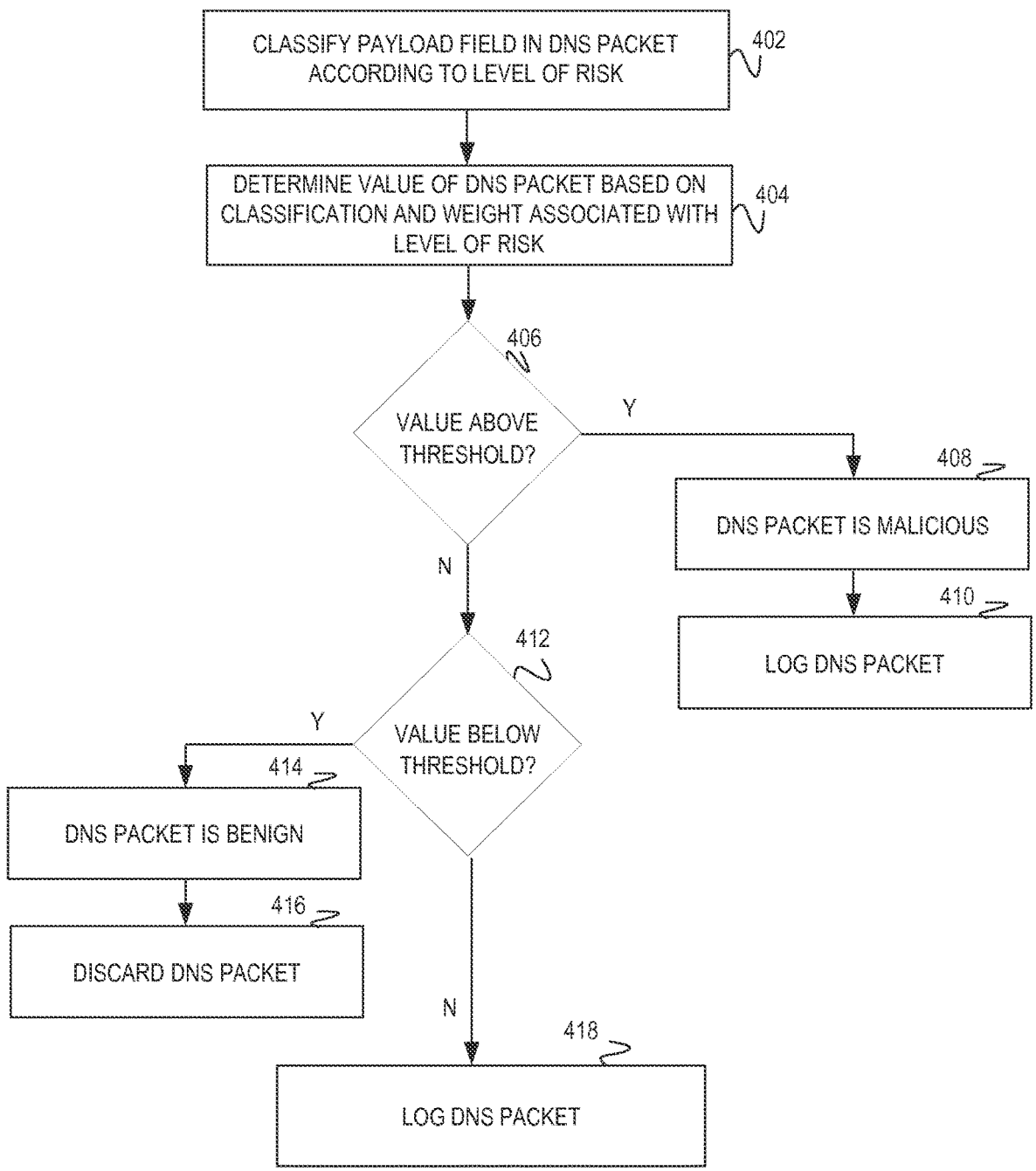
FIG. 4 is a flowchart of an example method executable by a computing device to either log a DNS packet or discard the DNS packet based on whether the DNS packet is malicious or benign, accordingly.

FIG. 4 illustrates a flowchart of an example method to identity whether a DNS packet is malicious by determining if a value is above or below a specified threshold. The method is executable by a computing device to classify a payload field in a DNS packet in accordance to a level of risk. Based on the level of risk classification and based on a weight associated with a specific level of risk, the computing device proceeds to determine the value. Using the value, the computing device proceeds to identify whether the value is above or below a specified threshold. The specified threshold is a value specified by an administrator in which DNS packets may be dropped or logged. In another implementation, a packet rate may adjust the threshold so that a particular rate of DNS packets may be dropped or logged, accordingly. In this instance the packet rate may be referred to as the packet drop rate or the packet log rate. For example, if an administrator chooses to capture more malicious traffic (e.g., data packets), the threshold is adjusted to lesser value. If the administrator chooses to discard more benign traffic, the threshold is adjusted to a greater value. In discussing FIG. 4, references may be made to the components in FIGS. 1-2 to provide contextual examples. In one implementation, the appliance 104 executes operations 402-418 to determine if the DNS packet is malicious and to respond accordingly. Although FIG. 4 is described as implemented by the appliance 104, it may be executable on other suitable components. For example, FIG. 4 may be implemented in the form of executable instructions on a machine-readable storage medium 604 and 704 as in FIGS. 6-7.

At operations 402-404, the computing device classifies the payload field within the DNS packet in accordance with the level of risk. Using the level of risk classification, the computing device determines the value. The value is based on the level of risk classification and the weight associated with the level of risk. For example, the value may be calculated through a statistical function such as summing together the weighted payload fields correspond to the specific level of risk and/or normalizing the value. These implementations may be discussed in detail in the next figure. Operations 402-404 are similar in functionality to operations 302-304 as in FIG. 3.

At operation 406, the computing device determines if the value is above the specified threshold. Thus, if the value is above the specified threshold, this indicates the DNS packet is malicious and should be logged for analysis.

At operation 408, if the computing device determines the value is above the specified threshold, then the DNS packet is considered to be malicious. Upon determining the DNS packet is malicious, the computing device proceeds to log the DNS packet at operation 410.

At operation 410, upon the determination that the DNS packet is malicious, the computing device logs the DNS packet. In one implementation, the computing device logs the DNS packet locally while in another implementation, the computing device transmits the DNS packet to another computing device to log the DNS packet. During the logging process, the computing device stores the DNS packet to process the malicious DNS packet for analysis. During the logging process, the computing device determines whether the requesting party is performing a domain generation algorithm (DGA). The DGA is used to periodically generate a large number of DNS traffic that can be used as rendezvous points with the corresponding command and control servers of malware resident on infected machines. Thus, the computing device may track a number of malicious DNS packets generated over a period of time from a particular requesting party (e.g., client). This indicates to the computing device whether the requesting party may be infected.

At operation 412, upon the DNS packet determining the value is not above the specific threshold, the computing device determines if the value is below the specified threshold. If the computing device determines the value falls below the specified threshold, then this indicates the DNS packet is benign as at operation 414. If the value neither falls above nor below the threshold, the value would fall within a threshold range, this indicates a middle level that the DNS packet may directed to a potentially malicious domain name. As such, the computing device may proceed to log the DNS packet for further analysis as at operation 418.

At operation 414, upon the determination the value falls below the threshold, the computing device identifies the DNS packet as benign. Identifying the value falls below the threshold, indicates to the computing device to discard the DNS packet as at operation 416.

At operation 416, upon the determination that the DNS packet is benign, the computing device discards the DNS packet. Discarding the DNS packet means to drop that DNS packet which are from or directed to a non-infected machine. This reduces the traffic which may be logged for the analysis.

At operation 418, if value is not above or below the specified threshold, the computing device may proceed to log the DNS packet. At operation 418, upon determining the DNS packet is neither malicious nor benign, this may indicate a middle level that the DNS packet may potentially be directed to a malicious domain. As such, the computing device may log the DNS packet for further analysis. Operation 418 may be similar in functionality to operation 410.

Figure 5:
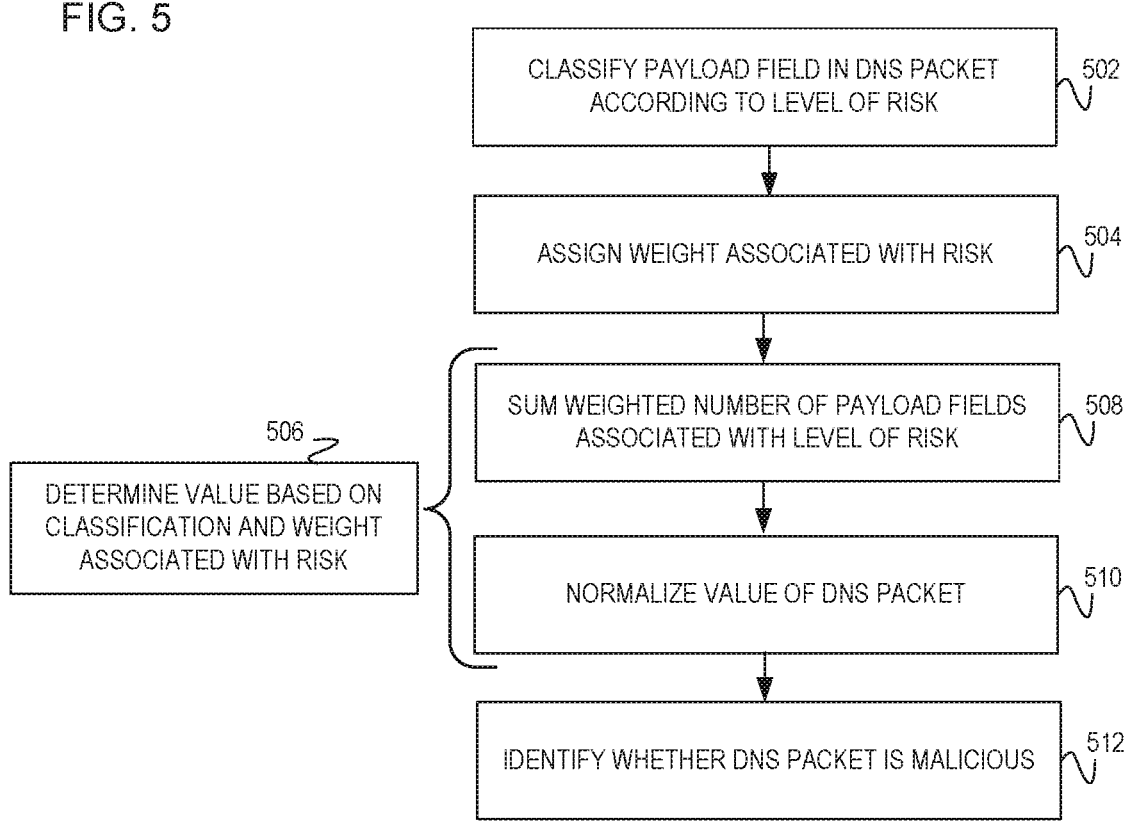
FIG. 5 is a flowchart of an example method executable by a computing device to identify whether a DNS packet is malicious by obtaining a value through various statistical functions.
Figure 7:
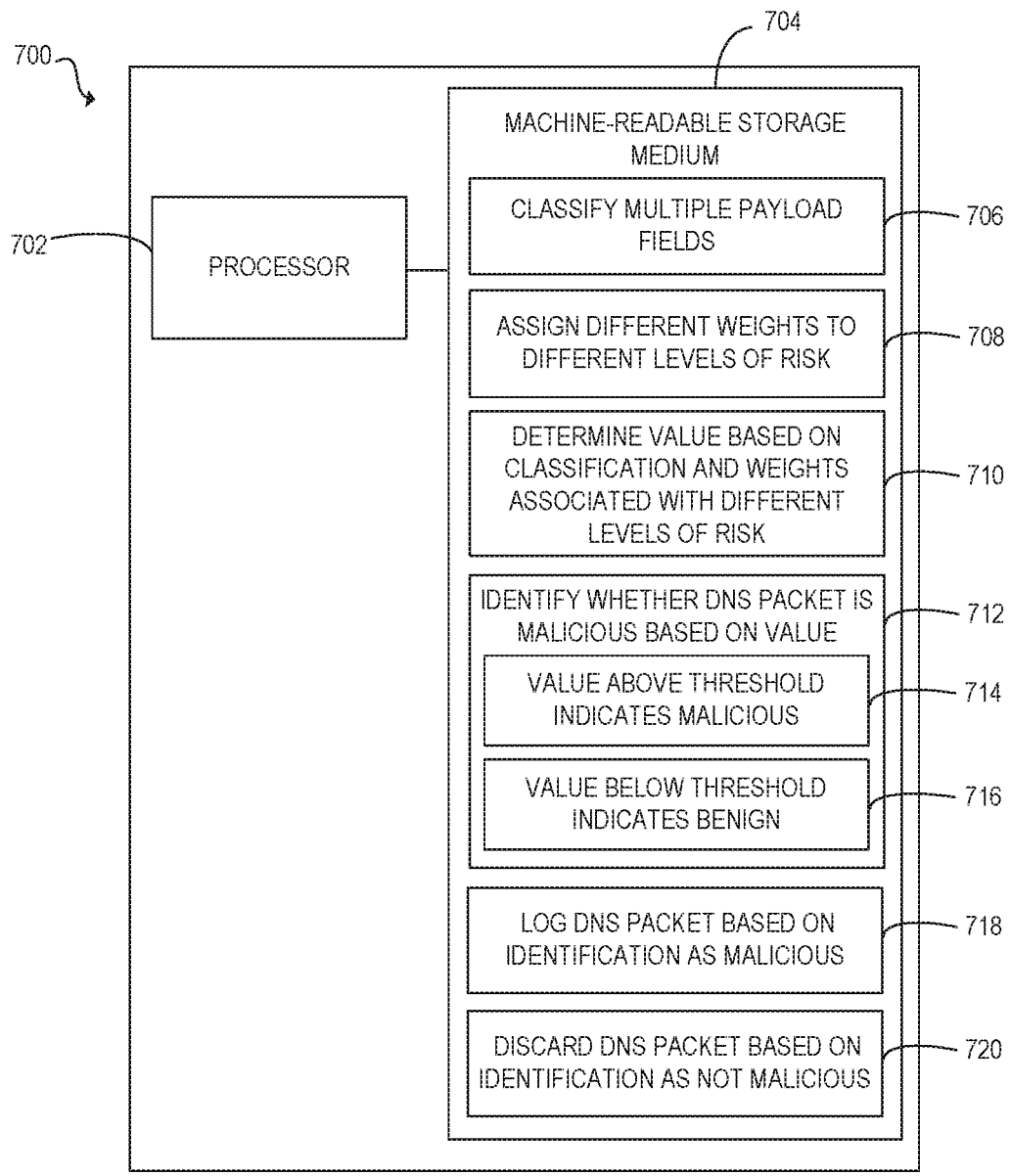

FIG. 5 is illustrates a flowchart of an example method to identify whether a DNS packet is malicious based on a determined value. The method is executable by a computing device to identify whether the DNS packet is malicious based on the value. The computing device parses out a payload field within the DNS packet and proceeds to classify the payload filed in accordance with a level of risk. If the payload field is directed towards a malicious domain name, the payload field is classified as a higher level for risk. If the payload field is directed towards a benign domain name, the payload field is classified as a lower level of risk. The computing device proceeds to assign a different weight to each of the levels of risk associated with the payload fields. For example, the higher level risk may be given greater weight than a lower level of risk. Upon assigning the different weights associated with the levels of risk, the computing device determines the value based on the classification of the payload fields and based on the different weights assigned to the different classifications. In one implementation, the computing device may determine the value by summing together the weighted number of payload fields associated with the different classifications high level of risk, low level or risk, etc.). Based on the determined value, the computing device may proceed to identify the DNS packet as malicious. In discussing FIG. 5, references may be made to the components in FIGS. 1-2 to provide contextual examples. In one implementation, the appliance 104 executes operations 502-512 to determine if the DNS packet is malicious and respond accordingly. Although FIG. 5 is described as implemented by the appliance 104, it may be executable on other suitable components. For example, FIG. 5 may be implemented in the form of executable instructions on a machine-readable storage medium 604 and 704 as in FIGS. 6-7.

At operation 502, the computing classifies the payload field in the DNS packet in accordance to the level of risk. The level of risk indicates whether the DNS packet is directed to a domain name which is malicious. For example, the level of risk may be identified by determining whether data within the payload field corresponds to a list of malicious domain names. If the data corresponds, this indicates a higher level of risk than if the data corresponds to a list of benign domain names. In another implementation, the computing device classifies multiple payload fields in the DNS packet. Operation 502 may be similar in functionality to operations 302 and 402 as in FIGS. 3-4.

At operation 504, the computing device assigns the weight associated with the level of risk. The computing device assigns different weights to the different levels of risk. Meaning, a higher level of risk is assigned a different weight than a lower level of risk, etc.

At operation 506, the computing device determines the value based on the classification identified at operation 502 and based on the weight assigned to the level of risk at operation 504. In implementations, the computing device determines the value by summing the weighted number of payload fields associated with the different levels of risk and/or normalizing the value of the DNS packet as at operations 508-510. Operation 506 may be similar in functionality to operations 304 and 404 as in FIGS. 3-4.

At operation 508, the computing device sums together the weighted number of payload fields associated with the levels of risk. Summing the weighted number of classified payload fields is considered a statistical function in which to determine the value. As such, the computing device calculates the value by summing together the weighted number of payload fields. The weighted number of payload fields may each contribute equally to the value, some of the classified levels of risk contribute more to the value than others. For example, a higher level of risk classification may include a heavier value weight than a lower level risk of classification. In another implementation, the computing device may additionally normalize the value as at operation 510.

At operation 510, the computing device normalizes the determined value at operation 506. Normalization of the determined value is another statistical approach to take when determining the overall value to identify whether the DNS packet is malicious. Normalizing the value means adjusting the scale to bring the probability of the determined value into alignment. For example, the DNS packet may include multiple payload fields. There may be a single higher level of risk payload field classification and several lower level of risk payload classification. Although the higher level of risk payload field may be weighted with a greater value, the greater amount of the lower level of risk classifications may affect the overall determined value. In this example, the value may indicate inaccurately the DNS packet is benign. Thus the overall value may be adjusted by summing the weighted payload fields and then averaging the number by the total number of fields to obtain the normalized value. The normalized value gives a more accurate value to identify whether the DNS packet is malicious.

At operation 512, the computing device identifies whether the DNS packet is malicious based on the value determined by operations 506-510. Operation 512 may be similar in functionality to operation 306 as in FIG. 3.

Figure 6:
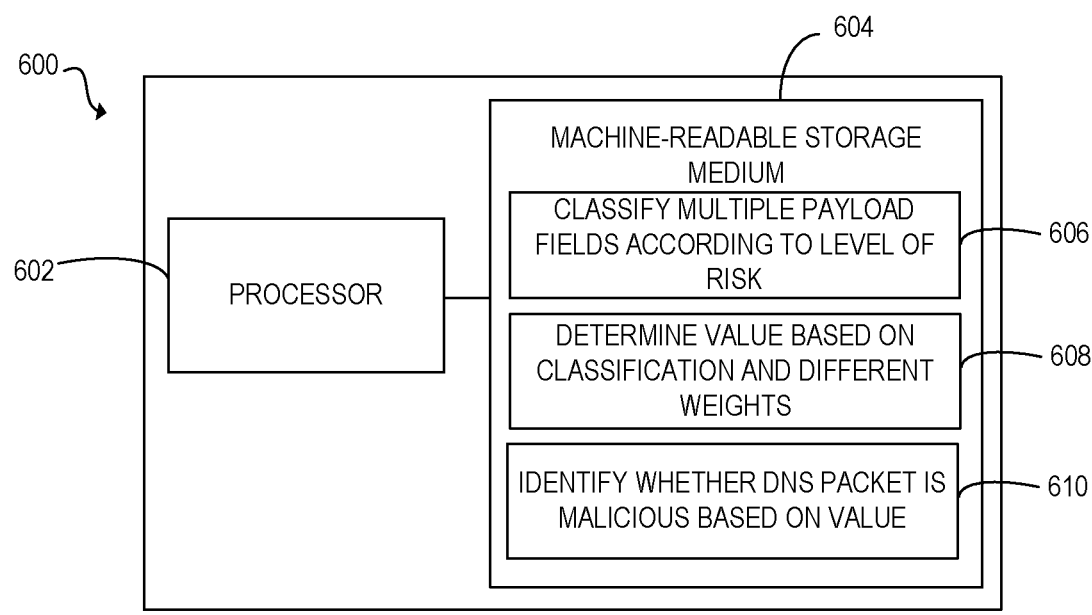
FIG. 6 is a block diagram of an example computing device with a processing resource to execute instructions in a machine-readable storage medium for classifying multiple payload fields and determining a value based on the classified multiple payload fields and a weight associated with levels of risk.

FIG. 6 is a block diagram of computing device 600 with a processing resource 602 to execute instructions 606-610 within a machine-readable storage medium 604. Specifically, the computing device 600 with the processing resource 602 is to identify whether a DNS packet is malicious based on a value obtained through classification of multiple payload fields. Although the computing device 600 includes processing resource 602 and machine-readable storage medium 604, it may also include other components that would be suitable to one skilled in the art. For example, the computing device 600 may include the appliance 108 as in FIG. 1. The computing device 600 is an electronic device with the processing resource 602 capable of executing instructions 606-610 and as such embodiments of the computing device 600 include an appliance, networking device, server, switch, mobile device, desktop computer, laptop, tablet, or other type of electronic device capable of executing instructions 606-610. The instructions 606-610 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-610 to identify whether the DNS packet is malicious based on a determined value. Specifically, the processing resource 602 executes instructions 606-610 to: classify multiple payload fields, each of the multiple payload fields classified in accordance with a level of risk associated with each payload field, determine a value based on the classification of each payload field and based on a weight associated with each of the different levels of risk; and identify whether the DNS packet is malicious based on the determined value.

The machine-readable storage medium 604 includes instructions 606-610 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processing resource 602 to fetch, decode, and/or execute instructions of the machine-readable storage medium 604. The application and/or firmware may be stored on the machine-readable storage medium 604 and/or stored on another location of the computing device 600.

Figure 7:
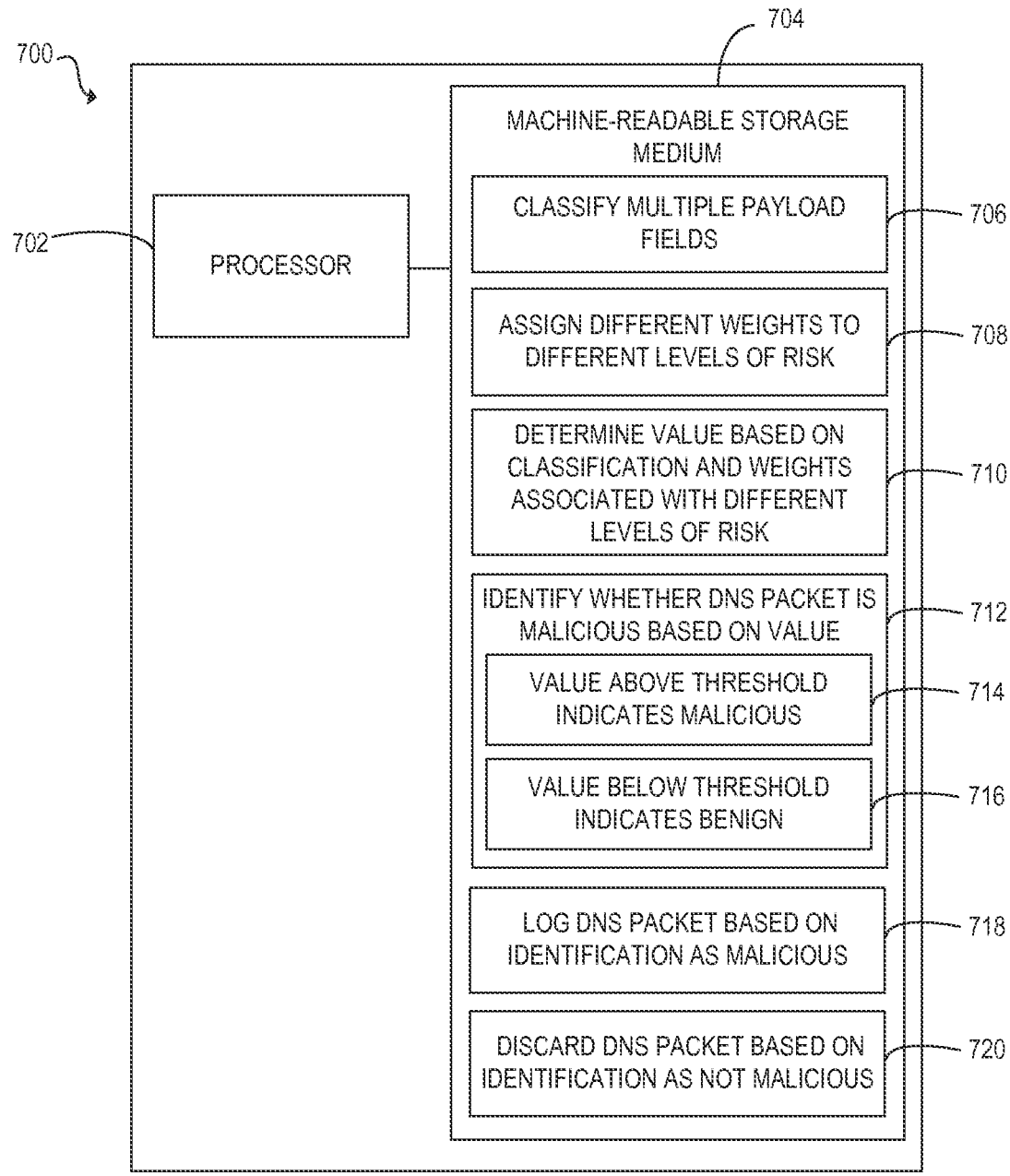
FIG. 7 is a block diagram of an example computing device with a processing resource to execute instructions in a machine-readable storage medium for either logging or discarding a DNS packet based on a value as determined by a level of risk classification for multiple payloads and different weights assigned to different levels of risk.
Figure 1:
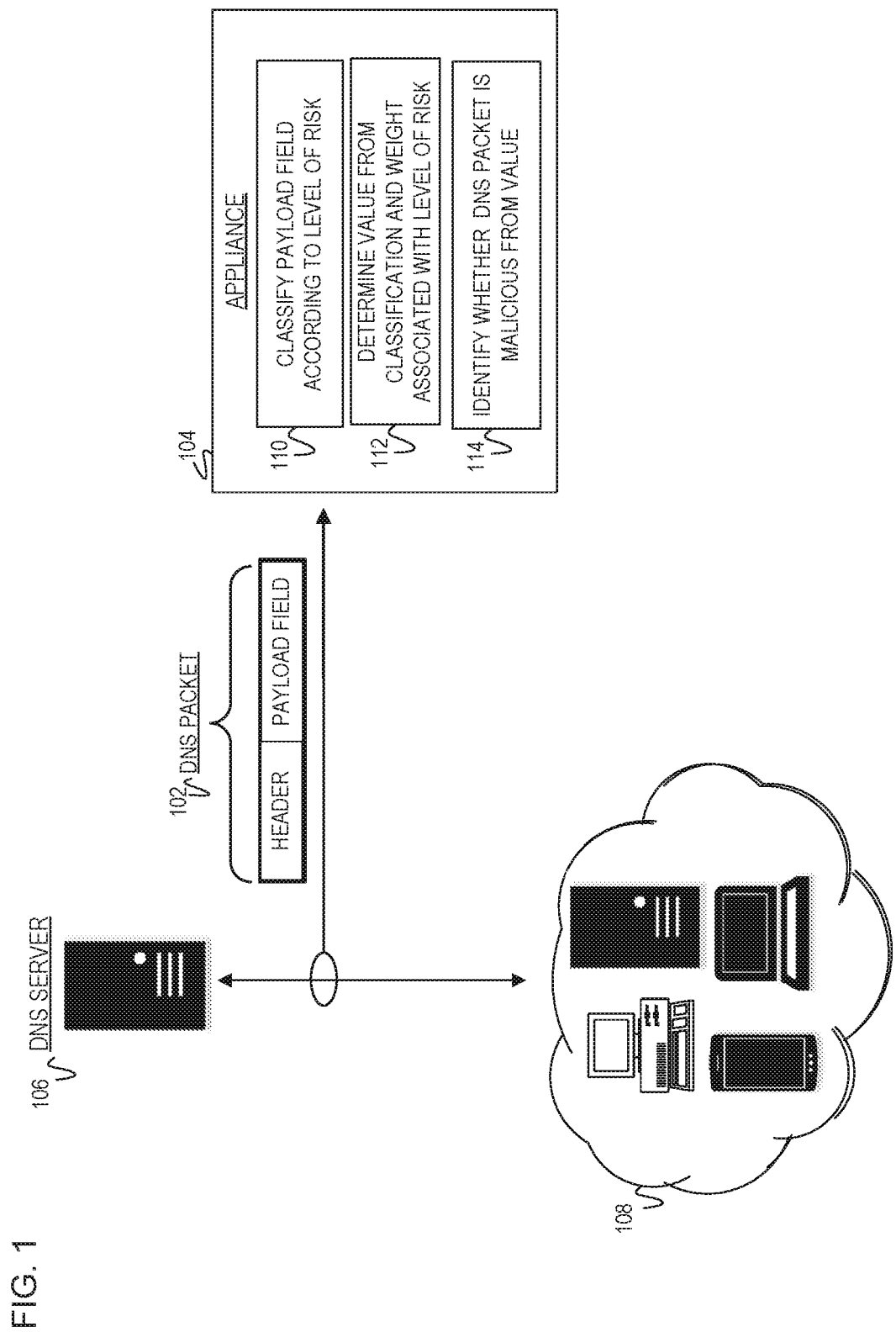
Figure 2:
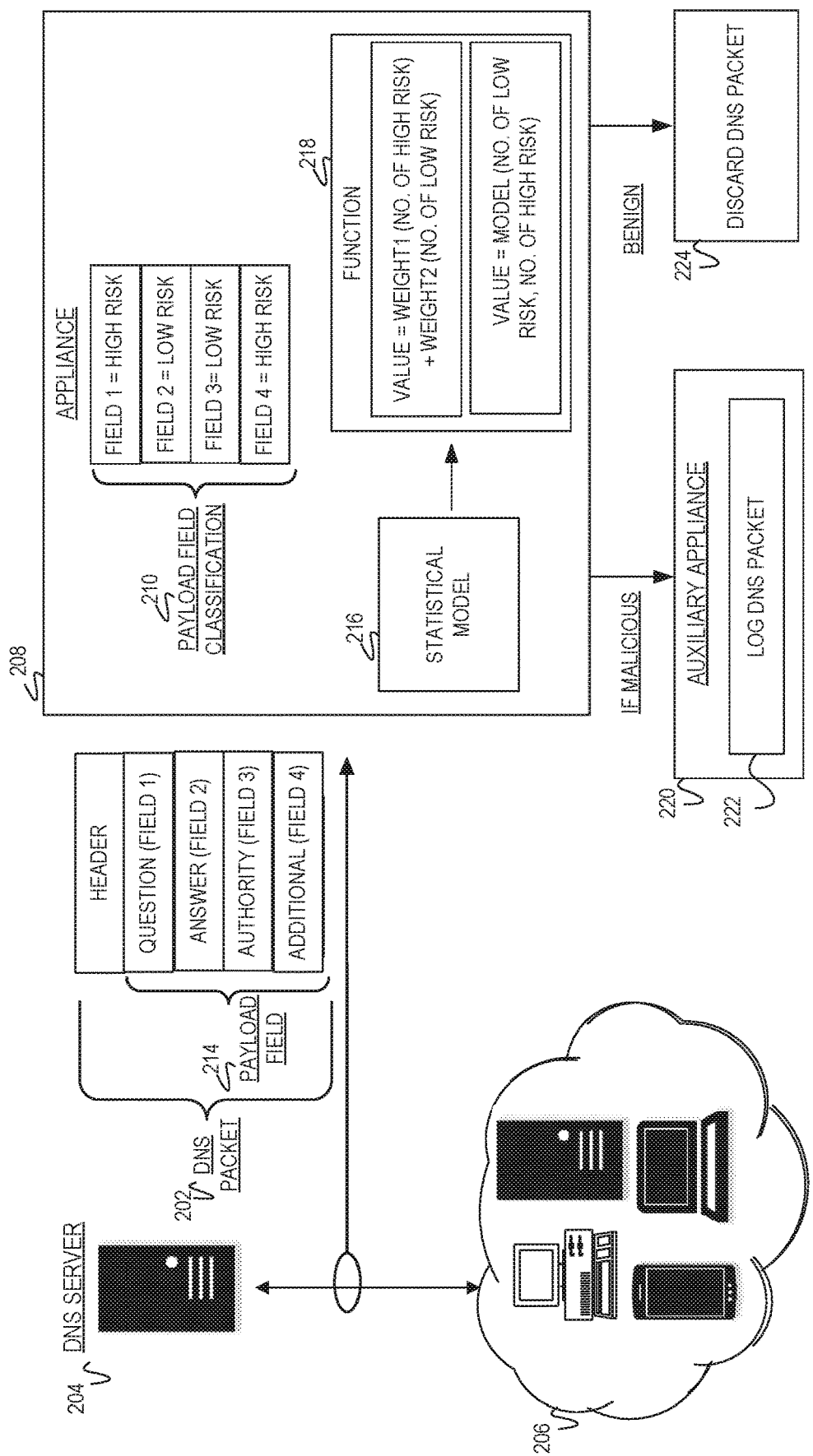
Figure 3:
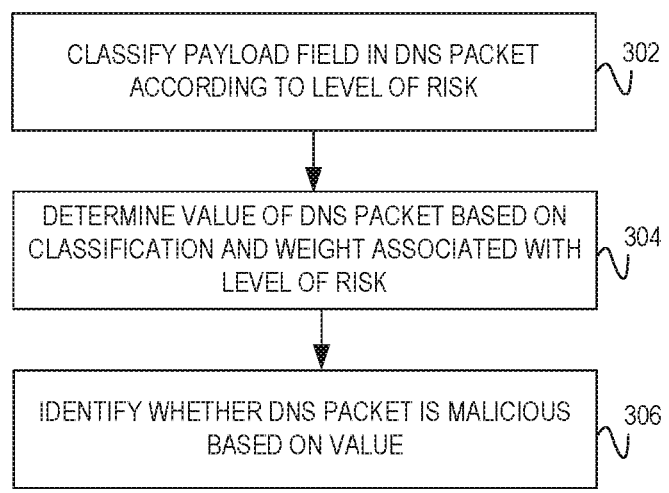
Figure 4:
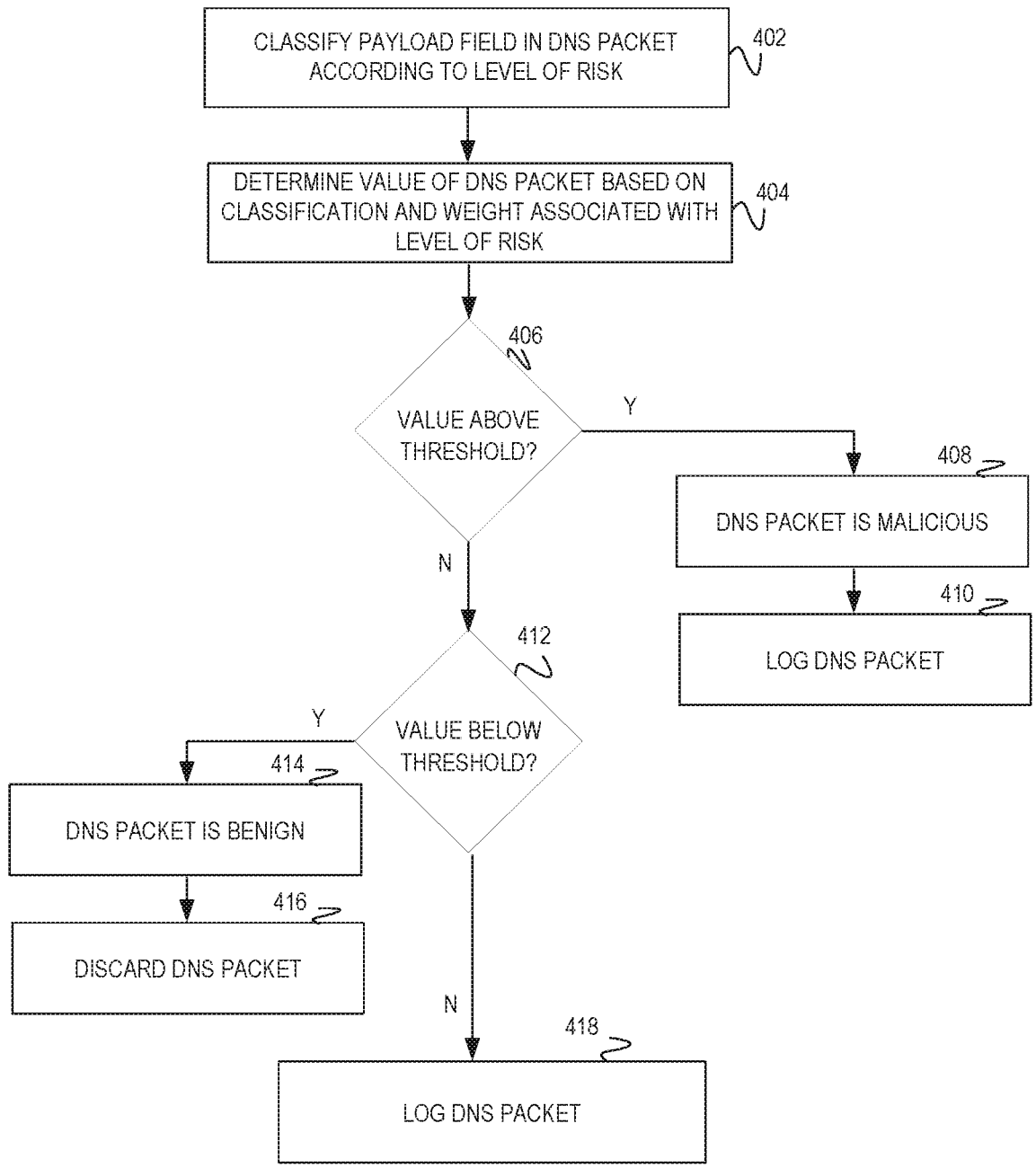

FIG. 7 is a block diagram of a computing device 700 with a processing resource 702 to execute instructions 706-720 within a machine-readable storage medium 704. Specifically, the computing device 700 with the processing resource 702 is to determine whether a DNS packet is malicious based on a value. Determining whether the DNS packet is malicious, the computing device 700 may proceed to execute instructions to log the DNS packet or discard the DNS packet. Although the computing device 700 includes the processing resource 702 and the machine-readable storage medium 704, it may also include other components that would be suitable to one skilled in the art. For example, the computing device 700 may include the appliance 104 as in FIG. 1. The computing device 700 is an electronic device with the processing resource 702 capable of executing instructions 706-720 and as such embodiments of the computing device 700 include an appliance, networking device, server, switch, mobile device, desktop computer, laptop, tablet, or other type of electronic device capable of executing instructions 706-720. The instructions 706-720 may be implemented as methods, functions, operations, and other processes implemented as machine-readable instructions stored on the storage medium 704, which may be non-transitory, such as hardware storage devices (e.g., random access memory (RAM), read only memory (ROM), erasable programmable ROM, electrically erasable ROM, hard drives, and flash memory).

The processing resource 702 may fetch, decode, and execute instructions 706-720 to identify whether the DNS packet is malicious based on the determined value. Specifically, the processing resource 702 executes instructions 706-720 to: classify each of the multiple payload fields in accordance with the level of risk; assign different weights to the different levels of risk; determine the value based on the classification of each of the multiple payload fields and based on the different weights assigned to the different levels of risk; identify whether the DNS packet is malicious based on the determined value; if the value is above a particular threshold, indicates the DNS packet is malicious; if the value is below the particular threshold, indicates the DNS packet is not malicious (i.e., benign); based on the determination the DNS packet is malicious, log the DNS packet; and based on the determination the DNS packet is benign, discard the DNS packet.

The machine-readable storage medium 704 includes instructions 706-720 for the processing resource 702 to fetch, decode, and execute. In another embodiment, the machine-readable storage medium 704 may be an electronic, magnetic, optical, memory, storage, flash-drive, or other physical device that contains or stores executable instructions. Thus, the machine-readable storage medium 704 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 704 may include an application and/or firmware which can be utilized independently and/or in conjunction with the processing resource 702 to fetch, decode, and/or execute instructions of the machine-readable storage medium 704. The application and/or firmware may be stored on the machine-readable storage medium 704 and/or stored on another location of the computing device 700.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

I claim:

1. A method for determining and logging electronic devices based on behavior, the method comprising:
capturing, at an electronic appliance, a domain name system (DNS) packet in communication traffic between a client device and a DNS server, wherein the DNS packet includes a header and a payload field of a plurality of payload fields, and wherein the plurality of payload fields correspond with at least one of a query field, a response field, an authority field, and an additional field;
determining, by the electronic appliance, a domain name from the payload field;
comparing, by the electronic appliance, the domain name from the payload field with a list of malicious domain names and a list of benign domain names;
when the domain name from the payload field is included with the list of malicious domain names and not included in the list of benign domain names, determining a value of the DNS packet;
when the value exceeds a specified threshold, identifying that the DNS packet is malicious; and
transmitting, by the electronic appliance, the DNS packet to an auxiliary appliance, wherein the auxiliary appliance is configured to log the DNS packet remotely from the electronic appliance and store the DNS packet locally at the auxiliary appliance.

2. The method of claim 1 comprising:
discarding a second DNS packet based on the identification of the second DNS packet as not malicious.

3. The method of claim 1 comprising:
assigning a weight associated with a level of risk, wherein different weights are assigned to different levels of risk.

4. The method of claim 3 wherein a higher weight is associated with a higher level of risk.

5. The method of claim 1 further comprising:
capturing a second DNS packet in the communication traffic between the client device and the DNS server;
determining a second value of the second DNS packet; and
when the second value is below the specified threshold, identifying that the second DNS packet is not malicious.

6. The method of claim 1 further comprising:
summing a weighted value for the plurality of payload fields associated with a plurality of levels of risk.

7. The method of claim 1 further comprising:
normalizing the value of the DNS packet through a normalization of weights.

8. The method of claim 1, wherein the DNS packet includes a second payload field of the plurality of payload fields, wherein the second payload field is a question field, wherein contents of the question field is included in blacklisted data, and wherein the value is increased based on the contents of the question field being included in the blacklisted data.

9. The method of claim 1, wherein the DNS packet includes a second payload field of the plurality of payload fields, wherein the second payload field is the authority field, wherein contents of the authority field are labeled as a low level of risk, and wherein the value is decreased based on the contents of the authority field being labeled as the low level of risk.

10. The method of claim 1, the method further comprising:
determining, by the electronic appliance, an ancestor domain name of the domain name from the payload field; and
adjusting the value of the DNS packet based on the ancestor domain name.

11. The method of claim 1, the method further comprising:
assigning weights to a plurality of values associated with the DNS packet, wherein the weights are determined using a machine learning model.

12. The method of claim 11, wherein a set of features are used with the machine learning model to learn a statistical function to determine the value of the DNS packet.

13. An electronic appliance comprising a processor and memory, wherein the processor is configured to implement computer-executable instructions stored on the memory to:
capture a domain name system (DNS) packet in communication traffic between a client device and a DNS server, wherein the DNS packet includes a header and a payload field of a plurality of payload fields, and wherein the plurality of payload fields correspond with at least one of a query field, a response field, an authority field, and an additional field;
determine a domain name from the payload field;
compare the domain name from the payload field with a list of malicious domain names and a list of benign domain names;
when the domain name from the payload field is included with the list of malicious domain names and not included in the list of benign domain names, determine a value of the DNS packet;
when the value exceeds a specified threshold, identify that the DNS packet is malicious; and
transmit the DNS packet to an auxiliary appliance, wherein the auxiliary appliance is configured to log the DNS packet remotely from the electronic appliance and store the DNS packet locally at the auxiliary appliance.

14. The electronic appliance of claim 13 is further configured to: obtain a function, wherein the function is used to determine the value.

15. The electronic appliance of claim 13 is further configured to:
identify a second DNS packet as malicious based on a determination a second value is above the specified threshold;
identify the second DNS packet as benign based on a determination the value is below the specified threshold; and
readjust the specified threshold based on specified packet drop rate.

16. A non-transitory machine-readable storage medium comprising instructions that when executed by a processing resource cause an electronic appliance to:
capture a domain name system (DNS) packet in communication traffic between a client device and a DNS server, wherein the DNS packet includes a header and a payload field of a plurality of payload fields, and wherein the plurality of payload fields correspond with at least one of a query field, a response field, an authority field, and an additional field;
determine a domain name from the payload field;
compare the domain name from the payload field with a list of malicious domain names and a list of benign domain names;
when the domain name from the payload field is included with the list of malicious domain names and not included in the list of benign domain names, determine a value of the DNS packet;
when the value exceeds a specified threshold, identify that the DNS packet is malicious; and
transmit the DNS packet to an auxiliary appliance, wherein the auxiliary appliance is configured to log the DNS packet remotely from the electronic appliance and store the DNS packet locally at the auxiliary appliance.

17. The non-transitory machine-readable storage medium of claim 16 comprising instructions that when executed by the processing resource further causes the electronic appliance to:
identify a second DNS packet as malicious based on a determination a second value is above the specified threshold; and
identify the second DNS packet as benign based on a determination the value is below the specified threshold.

18. The non-transitory machine-readable storage medium of claim 17 comprising instructions that when executed by the processing resource further causes the electronic appliance to:
discard the second DNS packet based on the identification of the DNS packet as not malicious.

19. The non-transitory machine-readable storage medium of claim 16 comprising instructions that when executed by the processing resource cause further causes the electronic appliance to:
use a set of features related to the multiple payload fields; and
obtain a function based on the set of features.

20. The non-transitory machine-readable storage medium of claim 16 comprising instructions that when executed by the processing resource further causes the electronic appliance to:
assign the different weights to the different levels of risk, wherein each level of risk is assigned a different weight.

* * * * *